Figure 1:
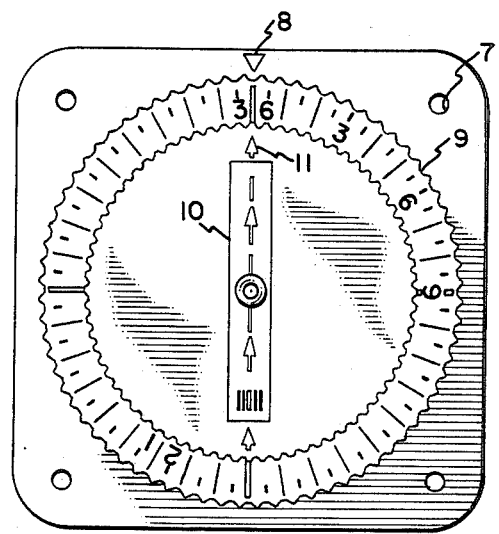

United States Patent [19]

Jensen, Jr.

[11] Patent Number: 4,686,929

[45] Date of Patent: Aug. 18, 1987

[54] AZIMUTH ORIENTATION DEVICE

[76] Inventor: William L. Jensen, Jr., 32 Diana La., Beacon Falls, Conn. 06403

[21] Appl. No.: 770,278

[22] Filed: Aug. 28, 1985

[51] Int. Cl.⁴ .......................... G09F 9/37; G09F 9/40
[52] U.S. Cl. .................................. 116/318; 116/307; 116/311; 116/DIG. 43
[58] Field of Search .................. 33/352; 116/311, 318, 116/316, 320, 319, 328, 329, DIG. 43, 307

[56] References Cited

U.S. PATENT DOCUMENTS

| 602,053 | 4/1898 | Brodie | 116/318 |
|---|---|---|---|
| 1,864,416 | 6/1932 | Conover | 116/318 |
| 2,253,279 | 8/1941 | Loew | 116/318 |
| 2,323,337 | 7/1943 | Lear | 33/352 |
| 2,532,974 | 12/1950 | Warner | 116/DIG. 43 |
| 2,750,917 | 6/1956 | Milligan | 116/311 |
| 2,832,220 | 4/1958 | Logie | 116/DIG. 43 |

FOREIGN PATENT DOCUMENTS

| 233175 | 5/1925 | United Kingdom | 116/316 |
|---|---|---|---|
| 1094700 | 12/1967 | United Kingdom | 116/320 |

Primary Examiner—Charles Frankfort
Assistant Examiner—Thomas B. Will

[57] ABSTRACT

An easily manipulable hand operable device for use in visualization of relative orientations for steering operations to a final azimuth orientation in homing of a fluid craft having an axis of symmetry and guidance system in making an approach in the homing. Three coaxial indicator discs are used.

2 Claims, 2 Drawing Figures

U.S. Patent  Aug. 18, 1987  4,686,929

AZIMUTH ORIENTATION DEVICE

This invention relates primarily to aircraft piloting and provides a solution to one of the problems encountered by pilots. When approaching airports, confusion often exists due to the pilot's inability to readily visualize the relationship or displacement of his own aircraft heading versus that of his intended landing runway. Although this visualization can be accomplished mentally, and often is, there are many times when confusion can exist, such as when the pilot is burdened with other tasks preparatory to landing and cannot focus full attention to the problem and/or when he is fatigued after a long flight, and/or when the airport is unfamiliar, and/or when approaching an airport at night or in poor visibility to poorly lit runway or one in which the lights can be confused with those along roads, etc. These causes for confusion can be quite insurmountable, especially when combinations of more than one exists at one time.

The invention explained here provides a simple, sure means to allow the pilot to aquire this needed azimuth orientation and to visualize and identify his landing runway and direction in relation to his existing aircraft heading.

Prior art devices were discovered during a patent search and bear some remote similarity to, but do not contain the elements required by, a device conforming to this invention, and in addition were not intended for a use even remotely related to that use intended for a device of this invention. They are cited as the closest inventions found in the patent files but do not teach the principles of the subject invention.

Some existing aircraft instruments and pilot aids intended for other purposes can be attempted to be used for the purpose of azimuth orientation but they do not contain all the elements taught in this invention. These include the aircraft compass, directional gyro, and the pilot's wind direction computer. The subject invention provides a means to substantially improve the pilot's ability to visualize his azimuth orientation over the attempted use of the foregoing instruments and aids for this purpose.

The device presented here is an example of one which conforms to the principles of the invention. It is not considered to be the only interpretation as many variations are possible within the confines of the claims. The specific example of a device conforming to this invention presented here is just one of many possibilities and should not be considered the only interpretation, and is not meant to limit the scope of the invention.

The drawings depict one example of a device conforming to the invention.

FIG. 1 is a frontal view where 7 is a mounting hole, 8 is an index mark, 9 is a 360 degree azimuth representation, 10 is a runway representation.

Figure 2:
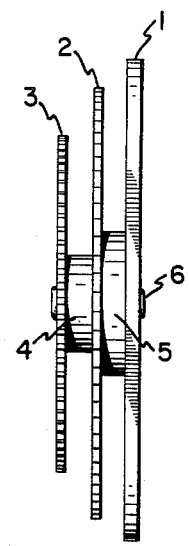

FIG. 2 is a side view of the same device in FIG. 1, where 1 is a base plate or non-rotatable display plane containing the index mark 8; 2 is a coaxially rotatable display plane or disc containing a 360 degree azimuth representation with 5 degree sub-divisions 9; 3 is a coaxially rotatable display plane or disc containing a runway representation 10; 4 and 5 are spacers, and 6 is a rivet providing an axle and fastener for all the structural members; 11 is an arrow or pointer representation.

In use, the pilot, in order to obtain runway orientation, would manually rotate the azimuth disc 2, to his aircraft heading (as given by the compass or directional gyro), then rotate the runway disc 3 so that the arrow 11 pointed to the correct runway heading on the azimuth disc 2. It is a convention that runway numbers, or names, are the same as the runway's magnetic heading without the last digit, i.e., runway 30, pronounced "three-zero," has a magnetic heading of 300 degrees plus or minus 5 degrees. (Runways are rounded off to the nearest 10 degrees). Runway 36 has a magnetic heading of 360 degrees. Runway 02 (zero-two or two) has a magnetic of 020 degrees. A feature of convenience is provided by the spacers 4 and 5 having sufficient thickness to allow the finger tips to grip the edges of the discs for easy rotation, and also it is significant that spacer 5 is larger than spacer 4. This, when properly designed, will cause the runway disc 3 to rotate with the azimuth disc 2 when the azimuth disc is manually rotated. Usually, several aircraft heading changes occur in an aircraft while maneuvering to land, so it is desired to reset the aircraft heading on the azimuth disc without resetting the runway disc.

I claim:

1. An easily manipulable hand operable device for use in visualization of relative orientations for steering operations to a final azimuth orientation in homing of a fluid craft having an axis of symetry and guidance system in making an approach in said homing comprising:

three planar surfaces represented by coaxial discs of different sizes with rims and hubs all relatively rotatable with respect to each other and disposed in separated parallel planes in decreasing disc size and forming two pairs of adjacent and juxtaposed disc combinations;

all three said rims of said discs lying in a surface formable by a conic-section rotated about an axes of revolution;

the hubs of said discs separated by two spacing sleeves of different sizes, the larger of said spacing sleeves separating the larger pair of said disc combinations a rivet sandwiching and compressing together said discs and said sleeves;

a representation of said final orientation in said approach in said homing on the smallest disc of said discs of different sizes;

azimuth representations on the middle disc of said discs of different sizes graduated entirely around said middle disc;

the largest disc of said discs of different sizes merely having an index mark on at least one imaginary circle representative of said largest disc;

sleeve and rivet compression being adjusted to that frictional forces drag without slip the smallest disc when unbiased by torque about the axis of said disc with said representation of said final orientation of said approach with use of one hand by any drive rotation of the middle azimuth disc while allowing adjustment of said smallest disc with said representation of said final orientation relative to the azimuth disc with slip with proper manipulation by direction manual adjustment of the smallest disc, thereby allowing easy hand manipulation of the device for said steering operations; and;

the largest disc having its index mark and axis fixed with respect to said axis of symetry of the fluid aircraft.

2. The device of claim 1 in which at least one of the smaller pair of said disc combinations may be adjusted remotely by a sensor in the guidance system of said fluid craft.

* * * * *